(Model.)
R. S. THOMPSON.
CASTER.
No. 331,461. Patented Dec. 1, 1885.
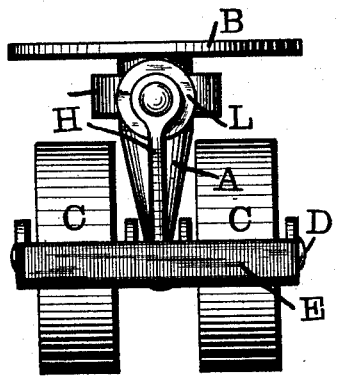
Fig. 1.
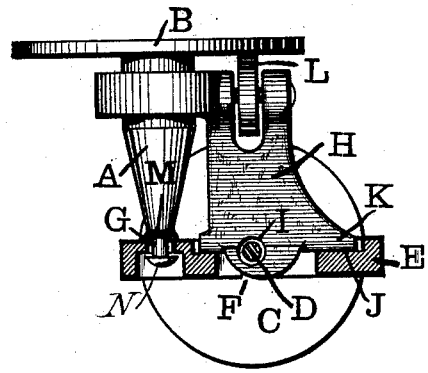
Fig. 2.
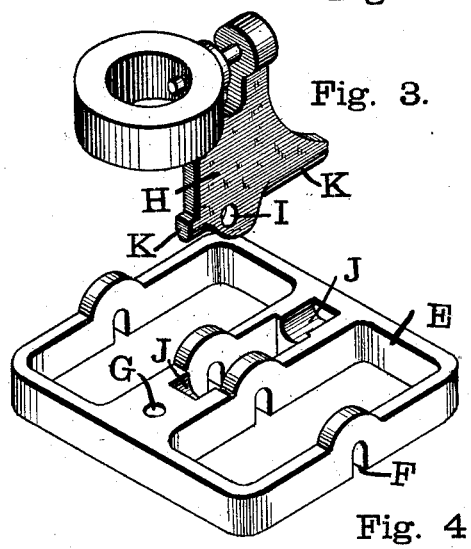
Fig. 3.
Fig. 4.
Witnesses:
W. A. Seward
E. A. Smith
Rachel S. Thompson
Inventor
by James N. See
Attorney

UNITED STATES PATENT OFFICE.

RACHEL S. THOMPSON, OF HAMILTON, OHIO.

CASTER.

SPECIFICATION forming part of Letters Patent No. 331,461, dated December 1, 1885.

Application filed May 20, 1885. Serial No. 166,211. (Model.)

*To all whom it may concern:*

Be it known that I, RACHEL S. THOMPSON, of Hamilton, Butler county, Ohio, have invented certain new and useful Improvements in Casters, of which the following is a specification.

This invention has reference to casters for use with furniture, &c.

The invention will be readily understood from the following description, taken in connection with the accompanying drawings, in which—

Figure 1 is a rear view of a caster embodying my improvements; Fig. 2, a side view of the same with one wheel removed and the wheel-housing and axle shown in vertical section; Fig. 3, a perspective view of the housing-hanger, and Fig. 4 a perspective view of the housing.

In the drawings, A represents the vertical stem of the caster; B, a plate formed thereon, and adapted to serve in attaching the caster to furniture, and also as a track for the anti-friction wheel; C, the two floor-wheels; D, the axle of the same, being a wire with a head at each end; E, the housing, consisting of a rectangular frame having side bars outside the floor-wheels, and having a central bar between the wheels; F, downwardly-open notches in all of the cross-bars of the housing, serving to receive the wheel-axle; G, a hole in the central cross-bar of the housing forward of the axle for the reception of the foot of the stem; H, a hanger attached to the stem by an encircling-band, and projecting downward in plate form to the rear of the stem into engagement with the housing between the wheels; I, a hole through the base of the hanger loosely engaging the axle of the floor-wheels; J, concave bearings in the central bar of the housing, one on each side of the axle of the floor-wheels, and having their axis at right angles to and substantially on the same level with the axle of the floor-wheels; K, the rounded base-edge of the plate of the hanger, adapted for oscillating engagement with the bearings just mentioned; L, an anti-friction wheel journaled in the top of the hanger at the rear of the stem, and adapted for rolling engagement with the under surface of the stem-plate; M, the foot-shoulder of the stem engaging the stem-bearing of the housing, and N a shoulder at the foot of the stem, facing upwardly and adapted to engage below the housing.

The rivet or axle in the anti-friction wheel may project through the band at the top of the hanger into engagement with a circumferential groove in the stem, so as to couple the hanger to the stem, such construction being common practice. The hanger is capable of swiveling upon the stem, but is not capable of oscillating thereon or with reference thereto, and the anti-friction wheel if used, serves in reducing the friction of the swiveling motion.

In putting the caster together the hanger is properly set in its housing-bearings, the two floor-wheels inserted, and the axle passed endwise through the housing-notches, through the wheels, and through the axle-hole of the hanger, after which the axle is headed or otherwise provided with end enlargements to prevent its displacement endwise. The housing is thus maintained in place by the upward engagement of the wheel-axle under it, and by the downward engagement of the hanger above it. The parts may all be in loose engagement without danger of separation. The notches are cast in the housing, as are also the housing-bearings and stem-bearing, no drilling or other labor, aside from mere casting, being involved in the construction of the housing. The housing is capable of free oscillation with reference to the hanger, whereby the two floor-wheels may accommodate themselves to irregularities of floor-surface.

The weight of the furniture is supported in a line vertically through the hanger-plate from the top of the anti-friction wheel to the hanger-bearings, and no bearing is essential at the foot of the spindle, the duty of the spindle being merely to serve as a draft element for the caster and as an element in the swiveling motion.

The axle of the anti-friction wheel engaging the stem-groove, as before referred to, will serve to prevent the separation of the stem and hanger, and under such circumstances that portion of the stem below the hanger-band is not called upon to perform any office.

If the anti-friction wheel be dispensed with, the pin forming its axle may still be retained as a device for coupling the housing to the stem, it being obvious that in such case there will be vertical strains imposed upon the stem of the caster. This strain may be met by the uniting band-pin engaging the groove of the stem, or by the footed shoulder of the stem engaging the housing. I prefer to also form upon the stem an upwardly-facing shoulder engaging below the housing, thereby holding the parts in closer relationship, so as to prevent rattling. In the example shown this upwardly-facing shoulder is formed upon a portion of the stem projecting downward through the hole G in the housing. Any part of the housing encircling the stem above the upwardly-facing shoulder will answer the same purpose.

An upwardly-presenting shoulder at the foot of the stem engaging below the housing, as clearly seen in Fig. 2, may serve to prevent the separation of the stem from the other parts, in case the pin-and-groove arrangement referred to is not employed.

In some cases the legs of furniture will be found of such form and dimension as not to permit of the use of the attaching plate, or of the use of an anti-friction wheel upon the hanger. In such cases I contemplate the use of any of the well-known means for connecting the stem of my caster to furniture, and the devices described will serve in uniting the other parts to the stem under almost any circumstances controlling the character of the stem.

It should be noted that the hole I in the hanger-plate is larger than the axle of the floor-wheels, this hole not being intended to form a bearing-hole upon the axle, its sole office being to prevent the axle being downwardly displaced from the notches of the housing.

It should be noticed that the hole I through the base of the hanger is, in the example shown, in the hanger. It is obvious that if the upper portion of the hanger be cut off and entirely removed the lower portion of the hanger will still serve as a retaining part for preventing the downward dislodgment of the axle from the notches. I very much prefer that this retaining part should be embodied in the same structure with the hanger, though of course it is not essential.

The lower portion of the hanger—that portion which engages over the housing and under the axle—I denominate the "retaining part" when speaking of it in connection with its function as a retainer for the axle.

I claim as my invention—

1. In a furniture-caster, the combination of a stem adapted for attachment to furniture, a hanger fitted to swivel thereon, and having at its base a hole for the axle of the floor-wheels, and also horizontal journals, a housing having bearings for the hanger-journals and bearings for the axle of the floor-wheels, floor-wheels, and a floor-wheel axle engaging the housing, the wheels, and the hanger, substantially as and for the purpose set forth.

2. In a furniture-caster, the combination of a rectangular wheel-housing having cross-bars provided with downwardly-opened notches, a wheel-axle seated upward within said notches, and a retaining part encircling the axle between the floor-wheels and engaging the top of the housing, and serving to prevent the axle from leaving said notches, substantially as and for the purpose set forth.

3. In a furniture-caster, the combination of a housing provided with bearings of oscillation, two floor-wheels and an axle secured in the housing, a stem adapted for attachment to furniture and bearing at its foot in the housing forward of the wheel-axle, and a hanger fitted to swivel upon the stem and journaled at its foot in the bearings of oscillation of the housing, substantially as and for the purpose set forth.

4. In a furniture-caster, the combination of a stem, A, adapted for attachment to furniture, and provided at its foot with an upwardly-facing shoulder, N, a housing, E, provided with an axle for two floor-wheels, and with a projection forward of the wheels encircling the stem above the shoulder, and a hanger, H, encircling the upper part of the stem and engaging the housing by bearings of oscillation, substantially as and for the purpose set forth.

5. In a furniture-caster, the combination of stem A, plate B, wheels C, axle D, housing E, having bearings J and hole G, hanger H, having hole I and journals K, and anti-friction wheel L, substantially as and for the purpose set forth.

RACHEL S. THOMPSON.

Witnesses:
J. W. SEE,
W. A. SEWARD.